(12) United States Patent
Nagai (10) Patent No.: US 6,578,653 B2
(45) Date of Patent: Jun. 17, 2003

(54) MOTORCYCLE

(75) Inventor: Hisao Nagai, Hamamatsu (JP)

(73) Assignee: Suzuki Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 09/941,768

(22) Filed: Aug. 30, 2001

(65) Prior Publication Data

US 2002/0023795 A1 Feb. 28, 2002

(30) Foreign Application Priority Data

Aug. 30, 2000 (JP) ........................................ 2000-261173

(51) Int. Cl.⁷ ............................................... B62D 61/02
(52) U.S. Cl. ...................................... 180/230; 180/219
(58) Field of Search ................................ 180/219, 226, 180/227, 229, 230

(56) References Cited

U.S. PATENT DOCUMENTS

| 4,412,515 A | * | 11/1983 | Fritzenwenger | 123/198 |
| 5,201,384 A | * | 4/1993 | Kiyota et al. | 180/219 |
| 5,367,998 A | * | 11/1994 | Shiohara et al. | 123/457 |
| 5,388,660 A | * | 2/1995 | Shirasagi et al. | 180/219 |
| 5,560,446 A | * | 10/1996 | Onishi | 180/219 |
| 5,657,628 A | * | 8/1997 | Takeuchi | 180/219 |
| 5,908,079 A | * | 6/1999 | Amino | 180/219 |
| 5,927,254 A | * | 7/1999 | Ino et al. | 123/470 |
| 2001/0007293 A1 | * | 7/2001 | Yamauchi | 180/219 |
| 2001/0047901 A1 | * | 12/2001 | Tsutsumikoshi | 180/219 |
| 2002/0027032 A1 | * | 3/2002 | Tsutsumikoshi | 180/219 |

FOREIGN PATENT DOCUMENTS

| JP | 11-105764 | * | 4/1999 | ........... B62K/11/10 |
| JP | 11-129969 | * | 5/1999 | ........... B62M/7/02 |

* cited by examiner

Primary Examiner—Lesley D. Morris
Assistant Examiner—Matthew Luby
(74) Attorney, Agent, or Firm—Oblon, Spivak, McClelland, Maier & Neustadt, P.C.

(57) ABSTRACT

In a motorcycle particularly of a scooter-type structure, an intake device is received in a rising portion of a tunnel shaped portion formed to a footrest floors of a motorcycle body, the intake device being provided with a cleaner box including an air cleaner, with a throttle body disposed on a downstream side of the cleaner box and with a surge tank disposed on a downstream side of the throttle body. The throttle body and the surge tank are placed side by side above a cylinder assembly of the engine unit, and the cleaner box is placed above the throttle body and the surge tank. These respective elements are connected by means of pipes so as to provide an S-shape structure in a plan view.

10 Claims, 7 Drawing Sheets

MOTORCYCLE

BACKGROUND OF THE INVENTION

The present invention relates to a motorcycle particularly of a scooter-type structure.

With respect to a motorcycle particularly having a scooter-type structure in which a portion between a handle bar and a driver's seat is considerably curved downward into a U-shape to form a straddling foot space extending in a transverse direction of a motorcycle (vehicle) body and low-floor type footrest floors, on which feet of a driver are to be rested, are formed on the opposite sides of the bottom portion of the straddling foot space, there exists such a scooter- type motorcycle as described, for example, in Japanese Patent Laid-Open Publication No. HEI 11-129969, in which an engine provided with a cylinder assembly disposed substantially horizontally is mounted in the vicinity of the footrest floors, an intake device is disposed along a down-tube, which extends rearward downward from the lower portion of the head pipe and an intake pipe directly connects the above-mentioned intake device with the engine.

In the scooter-type motorcycle described in the above-mentioned publication, the engine is utilized as a reinforcing member (i.e., a diamond-framework structure) for a body frame and the body frame is provided at the rear portion with a pivot member by which a swing arm is swingably supported.

Alternatively, there exists a scooter-type motorcycle as described, for example, in Japanese Patent Laid-Open Publication No. HEI 11-105764, in which a body frame is divided into two parts in the longitudinal direction of a motorcycle body, between which an engine is mounted so as to provide a reinforcing member, and the engine is provided at the rear portion with a pivot member by which a swing arm is swingably supported.

When an engine capable of performing a high output at a low rotational speed as in the scooter-type motorcycle is demanded, an intake passage is increased to thereby improve an intake efficiency of the engine by utilizing an intake pulsation, making the engine output characteristic to a low velocity type output characteristic.

In a case where the intake device is disposed along the down-tube extending from the lower portion of the head pipe and the intake pipe directly connects the above-mentioned intake device with the engine, a distance between the head pipe and the engine is, however, too small to provide a necessary length for the intake passage.

In a case where the engine is utilized as a part of the body frame or the engine supports the swing arm, it is necessary to increase the strength of the engine, leading to an increased weight thereof.

In a case where a drive pulley for a V-belt type automatic transmission device is secured to the end of a crankshaft of the engine and such a V-belt type automatic transmission device is placed so as to deviate from the engine as in the scooter-type motorcycle as described in the above-mentioned Japanese Patent Laid-Open Publication No. HEI 11-129969, the width of the engine in the transverse direction thereof increases, and application of the cradle-type framework structure, in which the body frame encloses the engine, causes the width of the body frame to increase further larger than that of the engine, thus exerting an influence on a bank angle.

SUMMARY OF THE INVENTION

An object of the present invention, which was made taking into consideration the above-described circumstances, is to substantially eliminate defects or inconveniences encountered in the prior art mentioned above and to provide a motorcycle, particularly of a scooter-type, provided with an intake passage having an increased length thereof.

Another object of the present invention is to provide a scooter-type motorcycle, which restrains a width of a body frame from increasing even when the cradle-type framework structure is applied.

These and other objects can be achieved according to the present invention by providing, in one aspect, a motorcycle in which a body frame and a body cover, located between a head pipe for steerably supporting a front wheel in a bilateral direction through a front fork and a driver's seat, are curved downward into a U-shape to form a straddling foot space extending in a transverse direction of a motorcycle body; low-floor-shape footrest floors, on which feet of the driver are to be rested, are formed on opposite sides of a bottom portion of the straddling foot space and a central portion between the footrest floors is formed into a shape of tunnel; and an engine unit, which has a crankcase including a V-belt type automatic transmission device provided with a drive shaft disposed so as to be separated from and in parallel to a crankshaft extending in the transverse direction of the motorcycle body and with a driven shaft, and which has a cylinder assembly disposed substantially horizontally in a front portion of the crankcase, is placed in the tunnel shaped portion, wherein an intake device is received in a rising portion of the tunnel shaped portion, the intake device being provided with a cleaner box including an air cleaner, with a throttle body disposed on a downstream side of the cleaner box and with a surge tank disposed on a downstream side of the throttle body; the throttle body and the surge tank are placed side by side above the cylinder assembly of the engine unit, and the cleaner box is placed above the throttle body and the surge tank; and the respective elements are connected by means of pipes so as to provide an S-shape structure in a plan view.

In a preferred example of this aspect, a radiator for cooling the engine unit is disposed on a front side of the cylinder assembly, the radiator being provided with a cooling fan for cooling the cooling water received in the radiator and the cooling fan being placed on a side of the surge tank in the transverse direction of the motorcycle body in a rear side of the radiator.

Moreover, leg shields are formed on opposite sides of the rising portion of the tunnel shaped portion and pocket spaces are formed in upper spaces of the leg shields on opposite sides of the cleaner box, respectively.

In another aspect of the present invention, there is also provided a motorcycle in which a body frame and a body cover, located between a head pipe for steerably supporting a front wheel in a bilateral direction through a front fork and a driver's seat, are curved downward into a U-shape to form a straddling foot space extending in a transverse direction of a motorcycle body; low-floor-shape footrest floors, on which feet of the driver are to be rested, are formed on opposite sides of a bottom portion of the straddling foot space and a central portion between the footrest floors is formed into a shape of tunnel; and an engine unit, which has a crankcase including a V-belt type automatic transmission device provided with a drive shaft disposed so as to be separated from and in parallel to a crankshaft extending in the transverse direction of the motorcycle body and with a driven shaft, and which has a cylinder assembly disposed substantially horizontally in a front portion of the crankcase, is placed in the tunnel shaped portion, wherein a power transmission direction change device for changing a rotational direction of the driven shaft to transmit a driving power of the engine unit to a propeller shaft for power transmission to a rear wheel is provided on a side of the engine unit; a pair of lower down-tubes extend rearward downward from a lower portion of the head pipe, pass through a space between the crankshaft and the power transmission direction change device and then extend rearward upward; a pair of main tubes extend rearward along an upper surface of the engine unit from rising portions of the lower down-tubes, to connect to the lower down-tubes at a rear side of the engine unit to form a loop-shaped frame in a side view; a sub-frame is detachably provided on a lower side of a connection portion of the main tubes and the lower down-tubes; and the sub-frame supports a suspension device for the rear wheel and a link mechanism for shock absorbers for supporting the suspension device.

In this aspect, the sub-frame supports the engine unit and a main stand of the motorcycle body.

In a further aspect of the present invention, there is also provided a motorcycle in which a body frame and a body cover, located between a head pipe for steerably supporting a front wheel in a bilateral direction through a front fork and a driver's seat, are curved downward into a U-shape to form a straddling foot space extending in a transverse direction of a motorcycle body; low-floor-shape footrest floors, on which feet of the driver are to be rested, are formed on opposite sides of a bottom portion of the straddling foot space and a central portion between the footrest floors is formed into a shape of tunnel; and an engine unit, which has a crankcase including a V-belt type automatic transmission device provided with a drive shaft disposed so as to be separated from and in parallel to a crankshaft extending in the transverse direction of the motorcycle body and with a driven shaft, and which has a cylinder assembly disposed substantially horizontally in a front portion of the crankcase, is placed in the tunnel shaped portion, wherein a primary drive gear for transmitting rotation of the crankshaft to the drive shaft is provided at one end of the crankshaft, the V-belt type automatic transmission device is disposed on an opposite side, the crankcase expands downward at a lower portion thereof on a side of the primary drive gear to form an oil pan in the crankcase, and an exhaust pipe, which has a base portion connected to a lower portion of the cylinder assembly, passes through a space below the V-belt type automatic transmission device in a vicinity of a side member of the oil pan to extend rearward.

According to the subject structures and characteristic features of the present invention, an intake device is received in a rising portion of the tunnel shaped portion, the intake device being provided with a cleaner box including an air cleaner, with a throttle body disposed on a downstream side of the cleaner box and with a surge tank disposed on a downstream side of the throttle body; the throttle body and the surge tank are placed side by side above the cylinder assembly of the engine unit, and the cleaner box is placed above the throttle body and the surge tank; and the respective elements are connected by means of pipes so as to provide an S-shape structure in a plan view. It is therefore possible to ensure an intake passage having a long scale, achieving a low velocity type output characteristic of the engine.

According to the feature that a radiator for cooling the engine unit is disposed on a front side of the cylinder assembly, the radiator being provided with a cooling fan for forcedly cooling the cooling water received in the radiator and the cooling fan being placed on a side of the surge tank in the transverse direction of the body in a rear side of the radiator, it is possible to improve cooling efficiency of the radiator.

According to the feature that leg shields are formed on opposite sides of the rising portion of the tunnel shaped portion and the pocket spaces are formed in upper spaces of the leg shields on opposite sides of the cleaner box, respectively, it is possible to use effectively a useless dead space in a conventional structure.

Furthermore, according to the present invention, the power transmission direction change device for changing a rotational direction of the driven shaft to transmit a driving power of the engine unit to a propeller shaft for power transmission to a rear wheel is provided on a side of the engine unit; a pair of lower down-tubes extend rearward downward from a lower portion of the head pipe, pass through a space between the crankshaft and the power transmission direction change device and then extend rearward upward; a pair of main tubes extend rearward along an upper surface of the engine unit from rising portions of the lower down-tubes, to connect to the lower down-tubes at a rear side of the engine unit to form a loop-shaped frame in a side view; a sub-frame is detachably provided on a lower side of a connection portion of the main tubes and the lower down-tubes; and the sub-frame supports a suspension device for the rear wheel and a link mechanism for shock absorbers for supporting the suspension device. Therefore, it is possible to reduce the distance between the lower down-tubes in the transverse direction of the vehicle body and improve the assembling and maintenance properties of the motorcycle.

According to the feature that the sub-frame supports the engine unit and the main stand, it is possible to improve assembling and maintenance properties thereof.

According further to the present invention as described above, the primary drive gear for transmitting rotation of the crankshaft to the drive shaft is provided at one end of the crankshaft, and the V-belt type automatic transmission device is disposed on an opposite side; the crankcase expands downward at a lower portion thereof on a side of the primary drive gear to form an oil pan in the crank case; and an exhaust pipe, which has a base portion connected to a lower portion of the cylinder assembly, passes through a space below the V-belt type automatic transmission device in a vicinity of a side member of the oil pan to extend rearward. It is therefore possible to ensure a sufficient bank angle and a sufficient ground clearance, and it is also possible to prevent the temperature of oil received in the oil pan from increasing.

The nature and further characteristic features of the present invention will be made more clear from the following descriptions with reference to the accompanying drawings.

DESCRIPTION OF THE PREFERRED EMBODIMENTS

Embodiments of the present invention will be described hereunder with reference to the accompanying drawings, in which it is to be noted that terms such as "upper", "lower", "vertical" and the like are used herein in an illustrated state or in a state of the motorcycle in a standing attitude.

Figure 1:
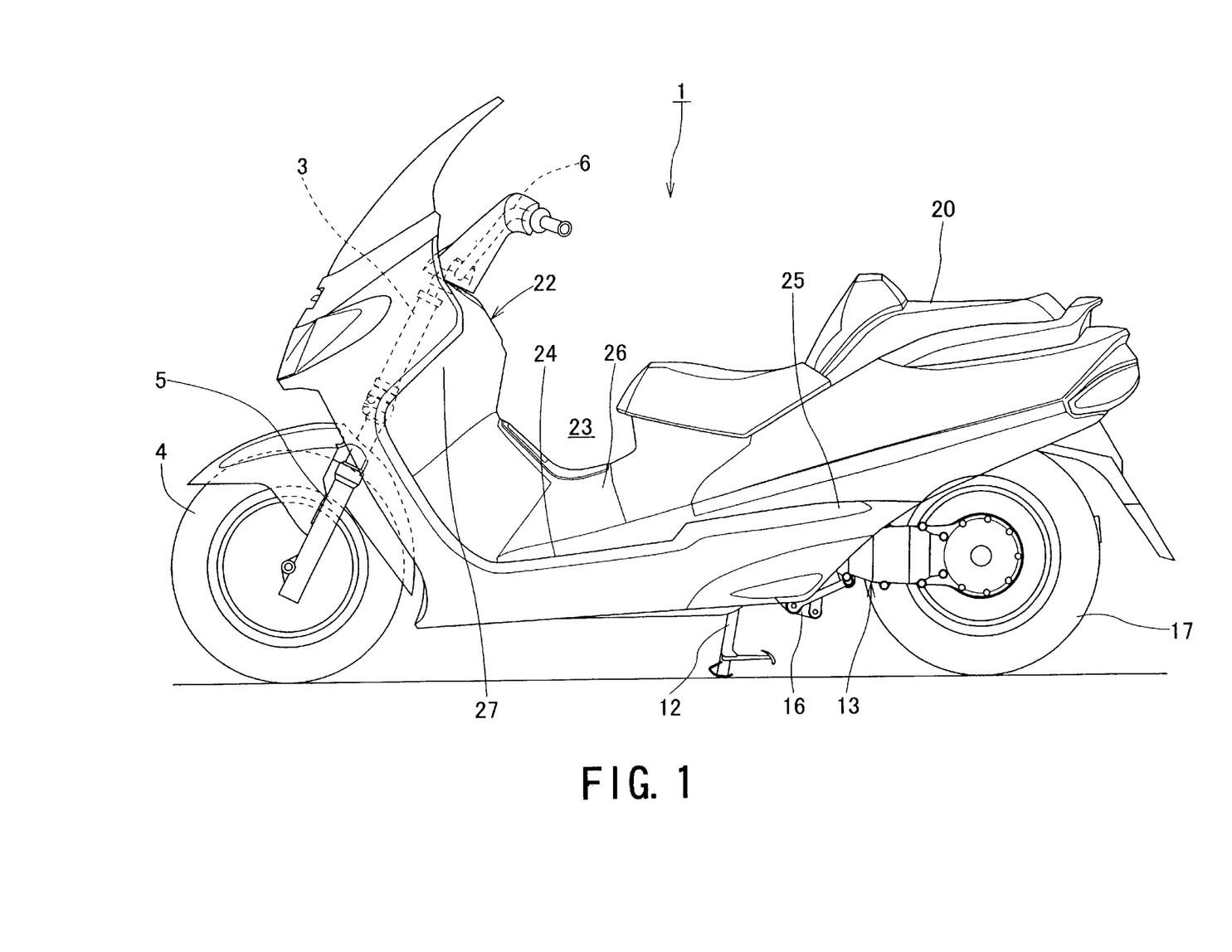
FIG. 1 is a left-hand side view illustrating an example of a scooter-type motorcycle according to the present invention.
Figure 2:
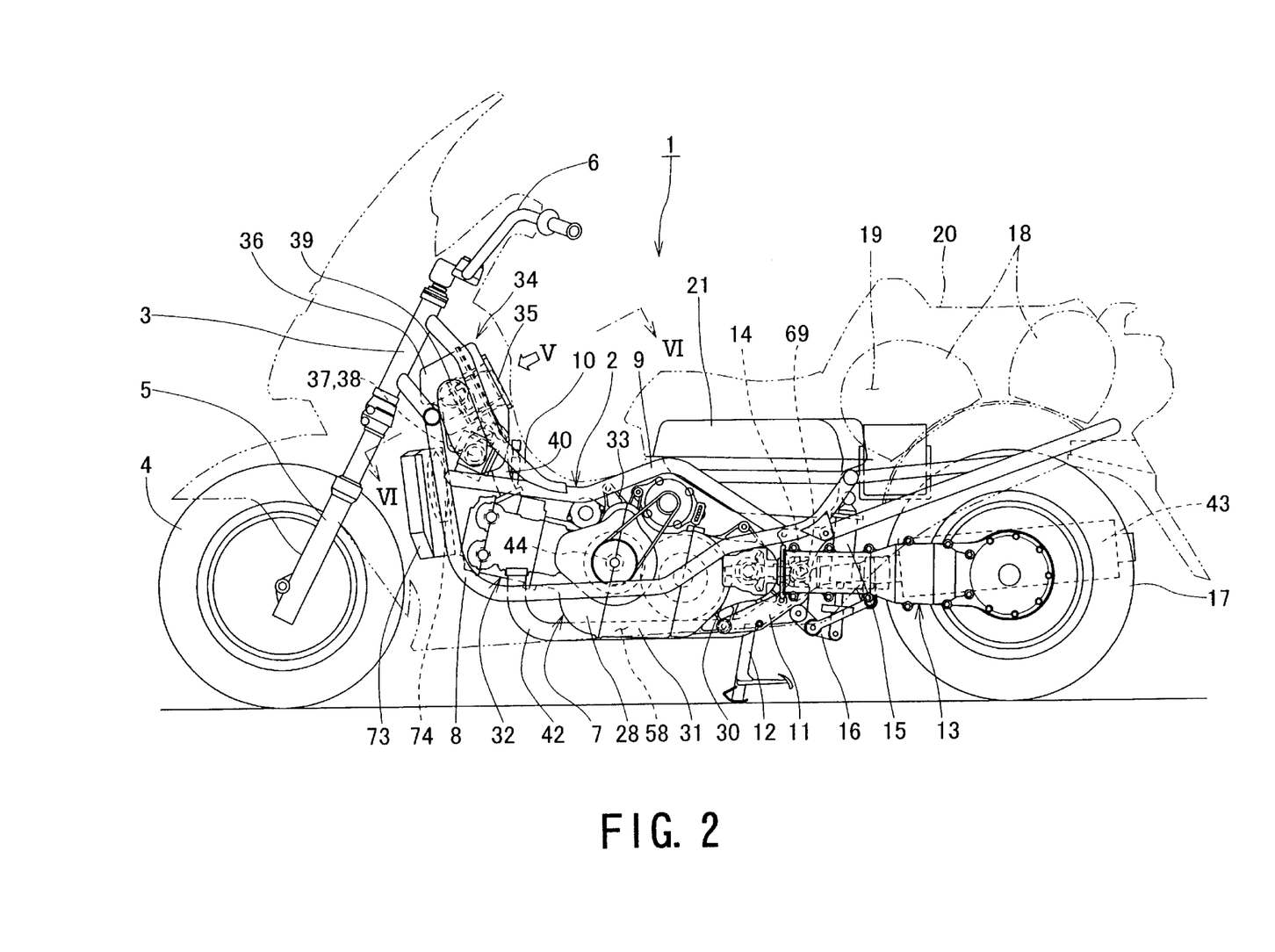
FIG. 2 is a left-hand side view illustrating the internal structure of the scooter-type motorcycle as shown in FIG. 1.
Figure 3:
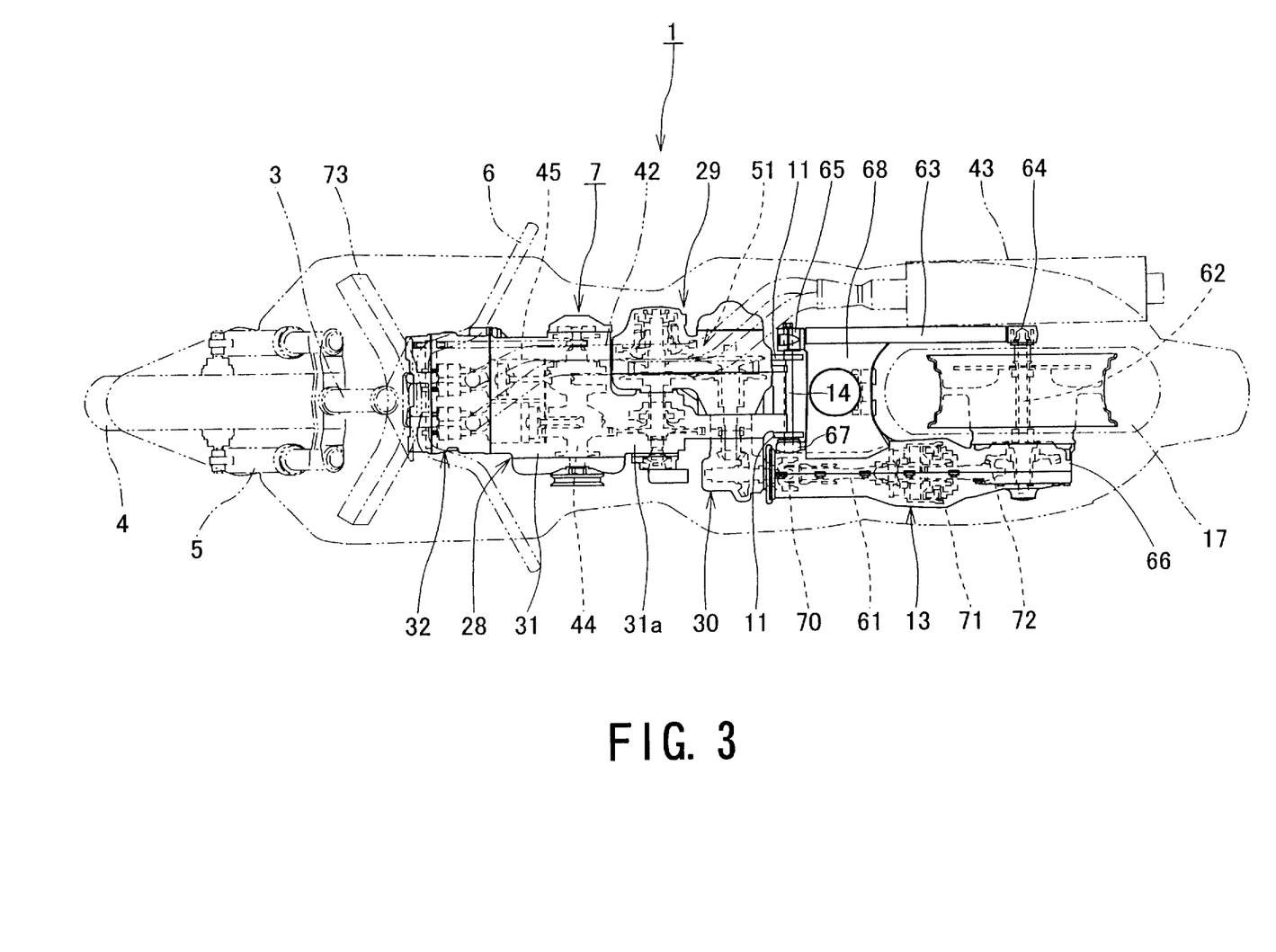
FIG. 3 is a schematic plan view of the scooter-type motorcycle as shown in FIGS. 1 and 2.

FIG. 1 is a left-hand side view illustrating an example of a scooter-type motorcycle to which the present invention is applied. FIG. 2 is a left-hand side view illustrating an internal structure of the scooter-type motorcycle. FIG. 3 is a schematic plan view of the scooter-type motorcycle as shown in FIGS. 1 and 2. As shown in FIGS. 1, 2 and 3, the scooter-type motorcycle 1 is provided with a body frame 2 having a front end on which a head pipe 3 is provided. The head pipe 3 is provided with a front fork 5 for rotatably supporting a front wheel 4, a handle bar 6 and the other components. The operation of the handle bar 6 causes the rotatable front wheel 4 to be steered in the bilateral direction of the motorcycle (vehicle) body.

An engine unit 7 is mounted on the middle and lower portion of the body frame 2. A pair of lower down-tubes 8 extends rearward downward from the lower portion of the head pipe 3 and pass through the opposite sides of the engine unit 7 to extend rearward upward. In addition, a pair of main tubes 9 extend rearward along an upper surface of the engine unit 7 from substantially the middle of the rising portions of the lower down-tubes 8 so as to be connected with the lower down-tubes 8 at the rear side of the engine unit 7 to thereby form a loop-shaped frame in the side view.

A pair of upper down-tubes 10 extends rearward downward from the upper portions of the head pipe 3 so as to be connected with the middle portions of the main tubes 9. A plate-shaped sub-frame 11 is detachably provided on the lower portion of the connection portion of the main tube 9 and the lower down-tube 8. The sub-frame 11 pivotally supports a main stand 12.

A transmission unit 13 serving as a power transmission device is disposed on the rear side of the engine unit 7. The front side of the transmission unit 13 is pivotally supported on the above-mentioned sub-frame 11 through a pivot shaft 14 described later. The transmission unit 13, which also serves as a swing-arm type rear suspension device, is elastically and swingably supported on the vehicle body by means of shock absorbers 15. The lower end of the shock absorber 15 is supported on the sub-frame 11 through a link mechanism 16 and the upper end thereof is supported on the rear end of the lower down tube 8. A rear wheel 17 serving as a driving wheel is supported on the rear end of the transmission unit 13.

An article accommodation box 19 serving as an article receiving container for a helmet 18, baggage, tools (not shown) or the like, is provided above the rear wheel 17. A driver's seat 20, which also serves as a cover for the article accommodation box 19, is provided above the article accommodation box 19 so as to be capable of being opened or closed. In addition, a fuel tank 21 is disposed between the front and lower portion of the driver's seat 20 and the rear and upper portion of the engine unit 7. The body frame 2 is surrounded by a body cover 22, which is formed of, for example, a synthetic resin.

The body frame 2 and the body cover 22, which are located between the head pipe 3 and the front portion of the driver's seat 20, are considerably curved downward into a U-shape to form a straddling space 23 extending in the transverse direction of the vehicle body. Low-floor type footrest floors on which feet of the driver are to be rested, and more specifically, footrest floors for a rider 24, which are placed between the main tube 9 and the lower down tube 8 of the body frame 2, are formed on the opposite sides of the bottom portion of the straddling space 23. Footrest floors 25 for a pillion rider, on which feet of a fellow passenger are to be rested, are provided behind the right and left-hand footrest floors for the rider 24. In addition, a tunnel-shaped member 26 projecting upward is formed on the central portion between the footrest floors for the rider 24 so as to extend in the longitudinal direction of the body to surround the main tubes 9. The tunnel-shaped member 26 rises forward and upward towards the head pipe 3 so as to surround the upper down-tubes 10. The tunnel-shaped member 26 is provided at the opposite sides of the rising portion with leg shields 27.

Figure 4:
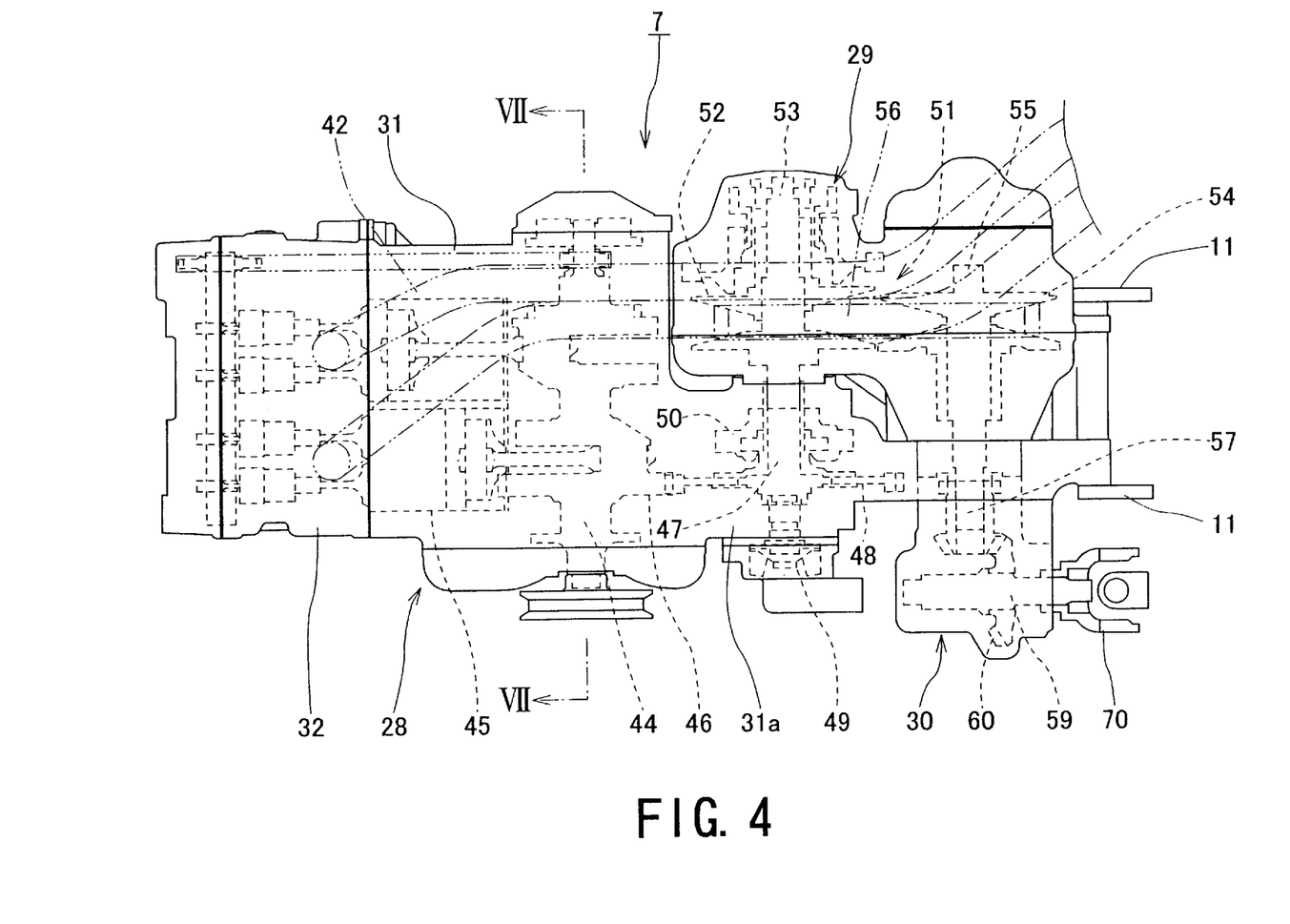
FIG. 4 is an enlarged plan view of the engine unit.

FIG. 4 is an enlarged plan view of the engine unit 7. As shown in FIGS. 2 to 4, the engine unit 7 is divided into three parts, i.e., an engine body 28 serving as a power generator, a transmission device 29 serving as a first transmitting element and a power transmission direction change device 30 serving as a second transmitting element. The engine body 28 is composed mainly of a crankcase 31 and a cylinder assembly 32, which is disposed substantially horizontally in the front side of the crankcase 31. The rear and lower portion of the engine body 28 is fixed to the sub-frame 11 and the remaining portions are fixed to the body frame 2 through brackets 33 or the like.

Figure 5:
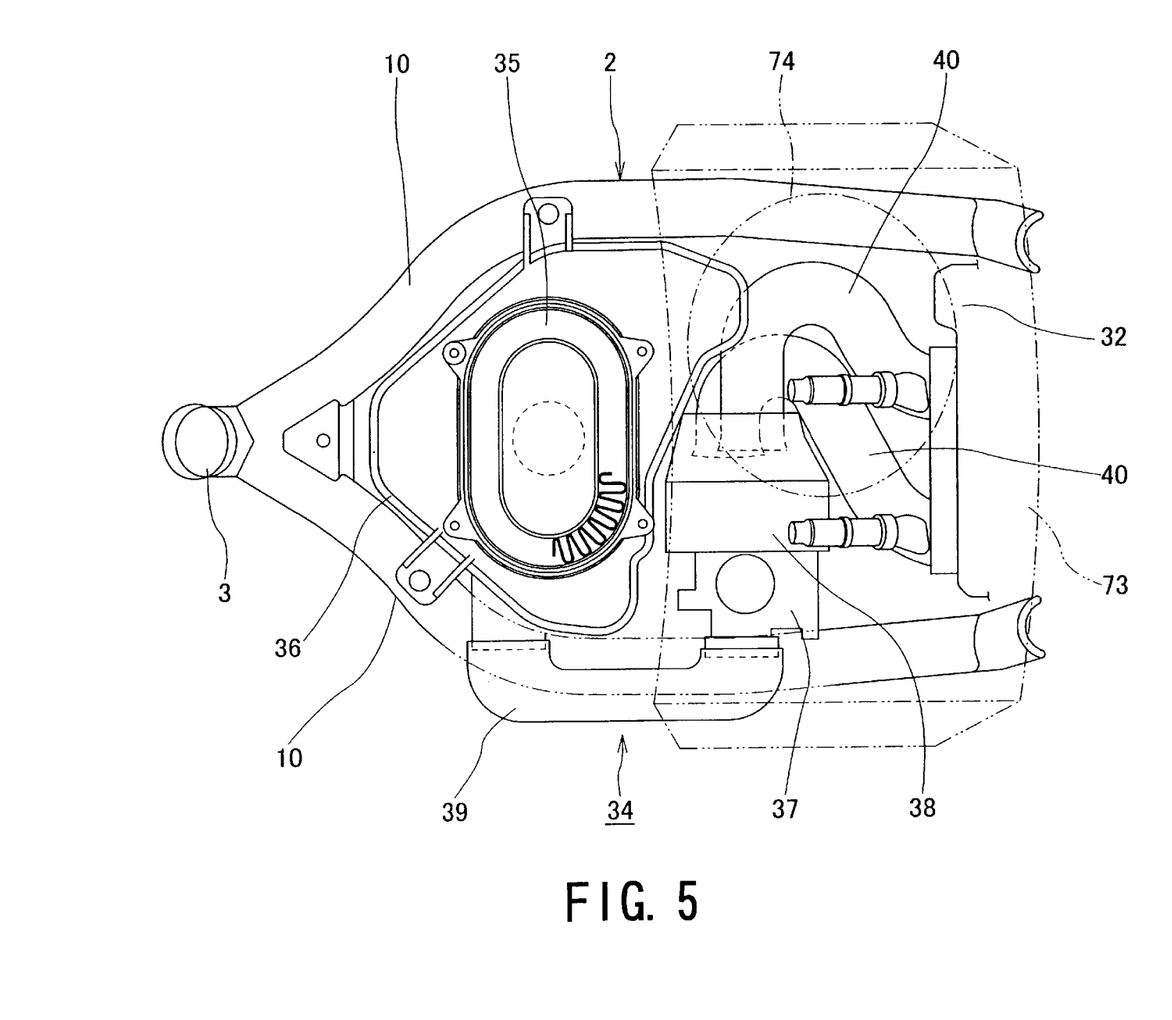
FIG. 5 is a view in a viewing direction of an arrow V of FIG. 2.
Figure 6:
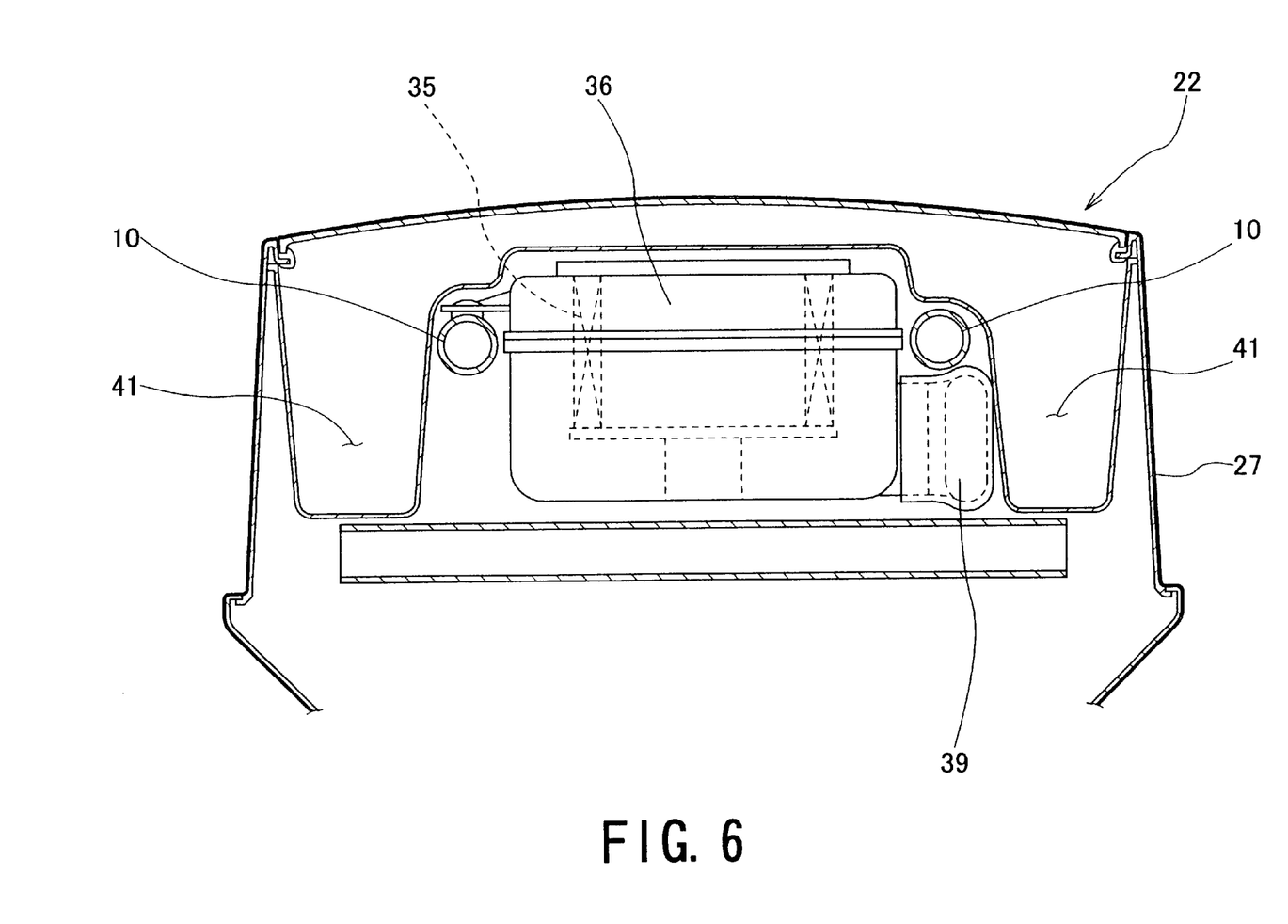
FIG. 6 is a cross-sectional view cut along the line VI—VI of FIG. 2.

FIG. 5 is a view in a direction of an arrow V of FIG. 2. FIG. 6 is a cross-sectional view taken along the line VI—VI of FIG. 2. As shown in FIGS. 2, 5 and 6, an intake device 34 is disposed above the cylinder assembly 32. The intake device 34 is provided with a cleaner box 36 including therein an air cleaner 35, with a throttle body 37 disposed on the downstream side of the cleaner box 36 and with a surge tank 38 disposed on the downstream side of the throttle body 37. The intake device 34 is received in the rising portion of the tunnel-shaped member 26, which is held between the upper down-tubes 10 of the body frame 2.

The throttle body 37 and the surge tank 38 are placed side by side above the cylinder assembly 32. The cleaner box 36 is placed above the throttle body 37 and the surge tank 38. In addition, the cleaner box 36 and the throttle body 37 are connected by means of a U-shaped cleaner outlet pipe 39 on the side surfaces thereof. The surge tank 38 disposed on the downstream side of the throttle body 37 and the upper portion of the cylinder assembly 32 are connected by means of a U-shaped intake pipe 40 on the opposite side surfaces thereof to the cleaner outlet pipe 39 so that the intake device 34 is connected in the S-shape in the plan view. Pocket spaces 41 are formed in the upper spatial portions of the leg shields 27 on the opposite sides of the cleaner box 36, respectively (see FIG. 6).

A base end of an exhaust pipe 42 is connected to the lower portion of the cylinder assembly 32. The exhaust pipe 42 is guided by the lower portion of the engine unit 7 so as to extend rearward and is connected at its downstream end with a muffler 43. In the embodiment of the present invention, the muffler 43 is placed on the right-hand side in the traveling direction of the vehicle body so as to be offset from the center of the body.

The engine body 28 used in the embodiment of the present invention is of so-called a parallel two cylinder-engine in which two cylinders 45 are placed side by side so as to have a common relation to a single crankshaft 44 extending in the transverse direction of the vehicle body in the crankcase 31.

A primary drive gear 46 is provided on the end of the crankshaft 44, i.e., left-hand end thereof in the illustrated embodiment of the present invention. The crankcase 31, which is located behind the primary drive gear 46, extends rearward to form an extended portion 31a, with the result that the crank case having an L-shape in the plan view is formed. A first connection shaft 47 is disposed in parallel with the crankshaft 44 in the inside of the extended portion 31a. The first connection shaft 47 is provided with a primary driven gear 48 to constitute a primary reduction gear device. The primary driven gear 48 is operatively connected to the primary drive gear 46 provided on the crankshaft 44 so that the rotational motion of the crankshaft 44 is transmitted to the first connection shaft 47.

A water pump 49 for a cooling water circulation is connected to the end of the first connection shaft 47, i.e., the left-hand end thereof in the embodiment of the present invention. An oil pump 50 for supplying lubricant oil under pressure is coaxially disposed on the other end of the first connection shaft 47, i.e., the right-hand end thereof in the embodiment of the present invention.

The transmission device 29 is disposed on the rear side of the crankcase 31 in which a V-belt type automatic transmission device 51 is placed. The transmission device 51 has a drive shaft 53 provided with a drive pulley 52 and a driven shaft 55 provided with a driven pulley 54. The drive shaft 53 is coaxially disposed on the first connection shaft 47 in a place facing the first connection shaft 47 in the transverse direction of the vehicle body, at the rear side of the crankshaft 44. A driven shaft 55 is disposed behind the drive shaft 53 so as to be in parallel with the drive shaft 53.

The end of the drive shaft 53, which faces the first connection shaft 47, i.e., the left-hand end thereof in the embodiment of the present invention is connected to the first connection shaft 47 through, for example, a spline connection structure. A V-belt 56 is stretched between the drive pulley 52 and the driven pulley 54 so that the rotational driving force of the engine body 28 is transmitted to the driven pulley 54 through the V-belt 56.

The transmission device 29 is formed into an L-shape in the plan view as in the crankcase 31. The transmission device 29 and the crankcase 31 are placed so that the inside surface of the bent portion of the former faces the inside surface of the bent portion of the latter.

The power transmission direction change device 30 is disposed behind the extended portion 31a of the crankcase 31, in which the second connection shaft 57 is disposed. The second connection shaft 57 is coaxially disposed on the drive shaft 55 in a place facing the driven shaft 55 in the transverse direction of the vehicle body. Both the shafts 55, 57 are connected to each other through, for example, a spline connection so that the rotational driving force of the engine body 28, which has been subjected to speed change by the transmission device 51, is transmitted to the second connection shaft 57.

Figure 7:
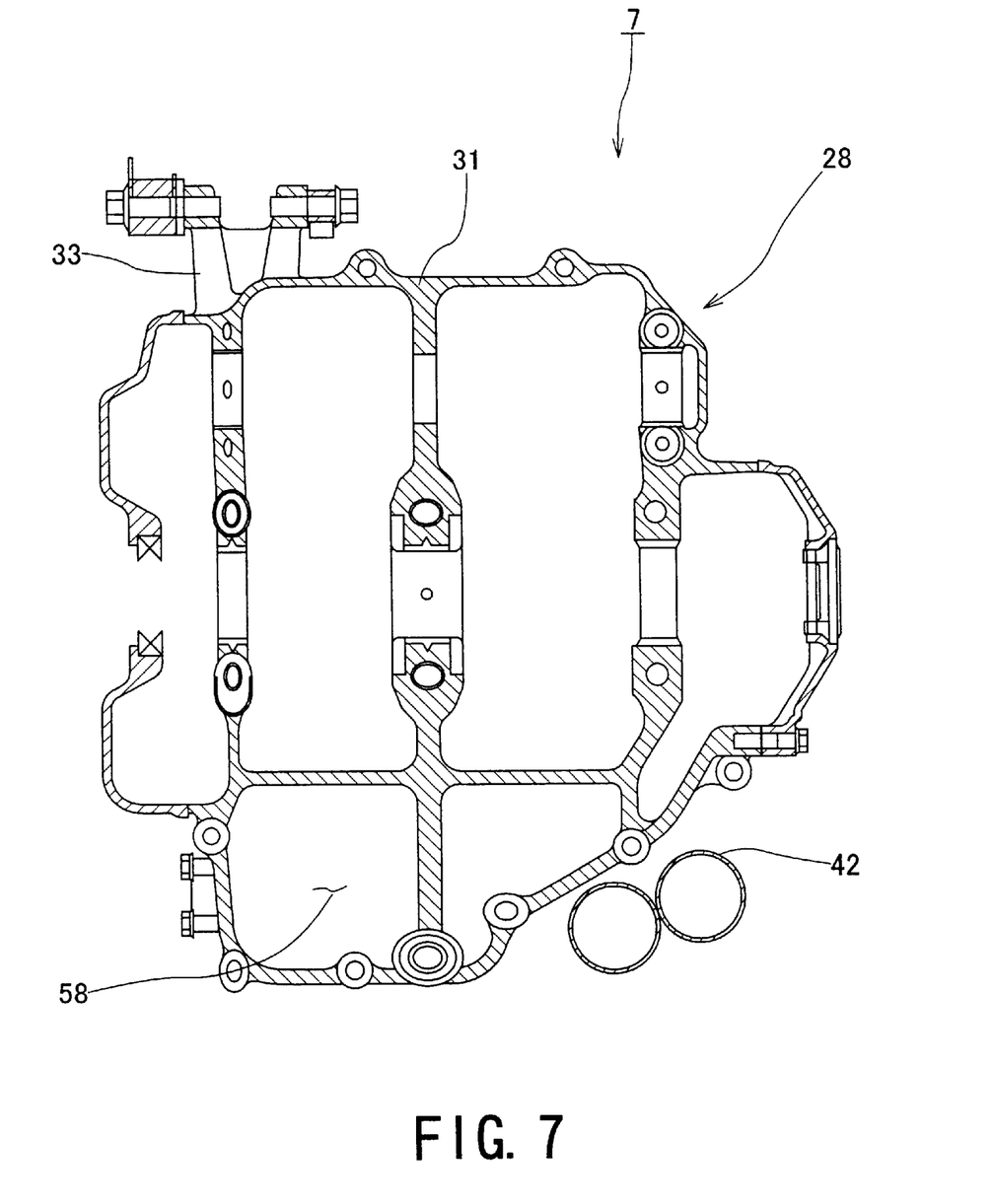
FIG. 7 is a cross-sectional view cut along the line VII—VII of FIG. 4.

FIG. 7 is a cross-sectional view taken along the line VII—VII of FIG. 4. As shown in FIGS. 2 and 7, the crankcase 31 expands downward at the lower portion of the primary drive gear side to form an oil pan 58 therein. The exhaust pipe 42, the base end of which is connected to the lower portion of the cylinder assembly 32, passes through a space below the V-belt type automatic transmission device 51 in the vicinity of the side surface of the oil pan 58 so as to extend rearward. The above-mentioned lower down-tubes 8 pass through a space between the crankshaft 44 and the power transmission direction change device 30 from the lower side of the crankshaft 44 so as to extend rearward upward.

A transmission shaft 59 serving as a final output shaft of the engine unit 7 is disposed in the power transmission direction change device 30 so as to cross at right angles to the second connection shaft 57 so that the power of the second connection shaft 57 is transmitted to the transmission shaft 59 through a bevel gear 60 serving as a secondary reduction gear device in a state that an angle between the input side shaft and the output side shaft becomes right angles. The rotational driving force of the engine body 28, which has been transmitted to the transmission shaft 59, is then transmitted to an axle shaft 62 for the rear wheel 17 through a propeller shaft 61 received in the above-mentioned transmission unit 13.

The transmission unit 13, which also serves as a swing-arm type rear suspension device as described above, is provided with a pair of arm members 13 and 63, which are placed in parallel to each other. One arm member, i.e., the right-hand side arm member 63 in the traveling direction of the vehicle body in the illustrated embodiment has a simple bar-shape (or tubular shape). The arm member 63 is provided at its rear end with a support member 64 for the axle shaft 62 and at its front end with a support member 65 for the pivot shaft 14.

The left-hand side arm member 13 in the traveling direction of the body in the illustrated embodiment is the transmission unit described above. The arm member 13 is formed into a hollow structure so that the power transmission elements such as the propeller shaft 61 and the like are received therein.

An arm base member 66 is provided at its front and inside portion with a support member 67 for the pivot shaft 14. The arm base member 66 and the right-hand side arm member 63 are connected to each other through a connection member 68 on the rear side of these support members 65 and 67. These support members 65 and 67 are pivotally supported on a pivot portion 69, which is provided on the sub-frame 11 for mounting the rear portion of the engine unit 7 on the body frame 2, by means of the pivot shaft 14.

The propeller shaft 61 received in the transmission unit 13 is connected to the transmission shaft 59 of the power transmission direction change device 30 through a universal joint 70. The universal joint 70 causes the rotational driving force of the engine body 28 to be transmitted to the propeller shaft 61.

A starting clutch mechanism 71 serving as the power transmission element is disposed in the middle of the propeller shaft 61 in the transmission unit 13. An electromagnetic controllable wet-type multiple disc clutch is, for example, used as the starting clutch mechanism 71.

The starting clutch mechanism 71 in the form of the electromagnetic controllable wet-type multiple disc clutch, which is not illustrated in detail, is provided with a pilot clutch that is electrically controllable in connection/disconnection operation and has a small transmission torque and with a main clutch, which permits to transmit a larger torque in comparison with the pilot clutch. Connection operation of the pilot clutch generates a rotational phase difference from the main clutch. The resultant rotational phase difference is converted into a pressure force against a pressure plate of the main clutch by means of a cam mechanism provided on the pilot clutch and then amplified, thus making it possible to carry out transmission of a large torque. It is possible not only to manufacture the electrically controllable pilot clutch in a small size and improve response of the clutch, but also to miniaturize the main clutch, thus leading to miniaturization of the entirety of the transmission unit 13. A centrifugal clutch mechanism, not shown, may be used in place of the starting clutch mechanism 71 in the form of the electromagnetic controllable wet-type multiple disc clutch.

The axle shaft 62 serving as the power transmission element is rotatably supported in the vicinity of the rear end portion of the propeller shaft 61. The power of the propeller shaft 61 is transmitted to the axle shaft 62 through a bevel gear 72 serving as the power transmission element and the final reduction gear device in a state that an angle between the propeller shaft 61 and the axle shaft 62 becomes right angles.

The engine body 28 mounted on the motorcycle 1 is of a water-cooling type and a radiator 73 for cooling water, which is used to cool the engine body 28, is disposed within the body cover 22 between the front wheel 4 and the engine body 28, which are placed in front of the cylinder assembly 32 (see FIGS. 2 and 3). The radiator 73 is provided with a cooling fan 74 for forcedly cooling the cooling water received in the radiator 73. The cooling fan 74 is placed on the side of the surge tank 38 in the transverse direction of the vehicle body in the rear side of the radiator 73.

The motorcycle of the structure mentioned above will be operated in the following manner.

The intake device 34 is received in the rising portion of the tunnel-shaped member 26, which is held between the upper down-tubes 10 of the body frame 2 on the front and upper side of the engine. The throttle body 37 and the surge tank 38 are disposed above the cylinder assembly 32 so as to be placed side by side. The cleaner box 36 is disposed above the throttle body 37 and the surge tank 38. The respective elements are connected by means of the pipes (i.e., the cleaner outlet pipe 39 and the intake pipe 40) so as to provide an S-shape structure in the plan view. According to such a structure, it is possible to ensure a long intake passage even in the narrow space. It is therefore possible to provide the intake device 34, which is suitable for the engine having a low velocity type output characteristic as in the scooter-type motorcycle 1 according to the present invention.

The surge tank 38 constituting the intake device 34 has a flat and simple shape in its contour in comparison with the throttle body 37, which is placed in the vicinity of the surge tank 38. As a result, when the cooling fan 74 for forcedly cooling the cooling water received in the radiator 73 is disposed on the side of the surge tank 38 in the transverse direction of the body at the rear side of the radiator 73, ventilation of the cooling air caused by the cooling fan 74 is improved, thus enhancing the cooling efficiency.

In addition, formation of the pocket spaces 41 in the upper spatial portions of the leg shields 27 on the opposite sides of the cleaner box 36 permits to use effectively a useless space in the prior art structure.

If the drive shaft 53 having the drive pulley 52 of the V-belt type automatic transmission device 51 is provided separately from the crankshaft 44 of the engine, it is possible to reduce the width of a portion of the crankcase 31, which corresponds to the crankshaft 44. In a case where a shaft-drive system for transmitting the driving power of the engine is applied to the rear wheel 17 and the propeller shaft 61 is placed on the middle side in the transverse direction of the body, the power transmission direction change device 30 for changing the transmission direction of the power of the driven shaft 55 of the V-belt type automatic transmission device 51 to transmit the power to the propeller shaft 61 projects over the side of the engine.

In the present invention, the lower down-tubes 8 pass through the space between the crankshaft 44 and the power transmission direction change device 30 from the lower side of the crankshaft 44 to extend rearward upward. According to such a structure, it is possible to reduce the distance between the lower down-tubes in the transverse direction of the vehicle body, thus ensuring a sufficient bank angle.

In addition, the swing arm, the link mechanism 16 for the shock absorber 15, and the sub-frame 11 for supporting the engine unit 7 and the main stand 12 are detachably provided on the body frame 2. Accordingly, it is possible to assemble, for example, the rear wheel suspension device including the swing arm into a unit body and then mount such a unit body on the body frame 2, thus improving remarkably assembling and maintenance properties.

Further, the primary drive gear 46 is provided at the end of the crankshaft 44 and the crankcase 31 expands rearward at the rear side of the primary drive gear 46 to form the extended portion 31a. The crankcase 31 expands downward at the lower portion of the primary drive gear 46 side to form an oil pan 58 therein. The exhaust pipe 42, the base end of which is connected to the lower portion of the cylinder assembly 32, passes through the space below the V-belt type automatic transmission device 51 in the vicinity of the side surface of the oil pan 58 to extend rearward. According to such a structure, it is possible not only to ensure a sufficient capacity of the oil pan 58, improving durability of the engine unit 7, but also to place the exhaust pipe 42 in a higher position than the lowest portion of the oil pan 58, ensuring a sufficient bank angle and a sufficient ground clearance.

It is also possible to place the exhaust pipe 42 apart from the oil pan 58 so as to prevent the temperature of oil received in the oil pan 58 from increasing due to heat from the exhaust pipe 42.

Furthermore, it is to be noted that the present invention is not limited to the described embodiments and many other changes and modifications may be made without departing from the scopes of the appended claims.

What is claimed is:

1. A motorcycle in which a body frame and a body cover, located between a head pipe for steerably supporting a front wheel in a bilateral direction through a front fork and a driver's seat, are curved downward into a U-shape to form a straddling foot space extending in a transverse direction of a motorcycle body;

low-floor-shape footrest floors, on which feet of the driver are to be rested, are formed on opposite sides of a bottom portion of the straddling foot space and a central portion between the footrest floors is formed into a shape of a tunnel;

and an engine unit, which has a crankcase including a V-belt type automatic transmission device provided with a drive shaft disposed so as to be separated from and in parallel to a crankshaft extending in the transverse direction of the motorcycle body and with a driven shaft, and which has a cylinder assembly disposed substantially horizontally in a front portion of the crankcase, is placed in said tunnel shaped portion, wherein an intake device is received in a rising portion of said tunnel shaped portion, said intake device being provided with a cleaner box including an air cleaner, with a throttle body disposed on a downstream side of the cleaner box and with a surge tank disposed on a downstream side of the throttle body;

said throttle body and said surge tank are placed side by side above the cylinder assembly of the engine unit, and said cleaner box is placed above the throttle body and the surge tank;

and the cleaner box, the throttle body and the surge tank are connected by pipes in an S-shape configuration in a plan view.

2. A motorcycle according to claim 1, wherein a radiator for cooling the engine unit is disposed on a front side of the cylinder assembly, said radiator being provided with a cooling fan for cooling the cooling water received in the radiator.

3. A motorcycle according to claim 1, wherein leg shields are formed on opposite sides of the rising portion of said tunnel shaped portion and pocket spaces are formed in upper spaces of said leg shields on opposite sides of the cleaner box, respectively.

4. A motorcycle according to claim 2, wherein said cooling fan is placed on a side of the surge tank in the transverse direction of the motorcycle body in a rear side of said radiator.

5. A motorcycle in which a body frame and a body cover, located between a head pipe for steerably supporting a front wheel in a bilateral direction through a front fork and a driver's seat, are curved downward into a U-shape to form a straddling foot space extending in a transverse direction of a motorcycle body;

low-floor-shape footrest floors, on which feet of the driver are to be rested, are formed on opposite sides of a bottom portion of the straddling foot space and a central portion between the footrest floors is formed into a shape of tunnel; and an engine unit, which has a crankcase including a V-belt type automatic transmission device provided with a drive shaft disposed so as to be separated from and in parallel to a crankshaft extending in the transverse direction of the motorcycle body and with a driven shaft, and which has a cylinder assembly disposed substantially horizontally in a front portion of the crankcase, is placed in said tunnel shaped portion, wherein a power transmission direction change device for changing a rotational direction of said driven shaft to transmit a driving power of the engine unit to a propeller shaft for power transmission to a rear wheel is provided on a side of the engine unit;

a pair of lower down-tubes extend rearward downward from a lower portion of the head pipe below a lower portion of the crankshaft, and extend rearward and upward so as to pass through a space between the crankshaft and the power transmission direction change device as viewed in a side view of the motorcycle body;

a pair of main tubes extend rearward along an upper surface of the engine unit from rising portions of the lower down-tubes, to connect to the lower down-tubes at a rear side of the engine unit to thereby form a loop-shaped frame in a side view of the motorcycle body;

a sub-frame is detachably provided on a lower side of a connection portion of the main tubes and the lower down-tubes; and said sub-frame supports a suspension device for the rear wheel and a link mechanism for shock absorbers for supporting the suspension device.

6. A motorcycle according to claim 5, wherein said sub-frame supports the engine unit and a main stand of the motorcycle body.

7. A motorcycle in which a body frame and a body cover, located between a head pipe for steerably supporting a front wheel in a bilateral direction through a front fork and a driver's seat, are curved downward into a U-shape to form a straddling foot space extending in a transverse direction of a motorcycle body;

low-floor-shape footrest floors, on which feet of the driver are to be rested, are formed on opposite sides of a bottom portion of the straddling foot space and a central portion between the footrest floors is formed into a shape of tunnel; and an engine unit, which has a crankcase including a V-belt type automatic transmission device provided with a drive shaft disposed so as to be separated from and in parallel to a crankshaft extending in the transverse direction of the motorcycle body and with a driven shaft, and which has a cylinder assembly disposed substantially horizontally in a front portion of the crankcase, is placed in said tunnel shaped portion, wherein a primary drive gear for transmitting rotation of the crankshaft to the drive shaft is provided at one end of the crankshaft, the V-belt type automatic transmission device is disposed on an opposite side, the crankcase expands downward at a lower portion thereof on a side of the primary drive gear to form an oil pan in the crankcase, and an exhaust pipe, which has a base portion connected to a lower portion of the cylinder assembly, passes through a space directly below the V-belt type automatic transmission device in a vicinity of a side member of the oil pan to extend rearward.

8. A motorcycle comprising:

a body having a tunnel shaped portion provided between a head pipe and a driver's seat;

an engine unit mounted to the body, the engine unit having a crankcase and a cylinder assembly disposed in a front portion of the crankcase, the cylinder assembly being provided within the tunnel shaped portion;

an intake device provided in a rising portion of the tunnel shaped portion, the intake device including:

a cleaner box having an air cleaner;

a throttle body disposed on a downstream side of the cleaner box; and a surge tank disposed on a downstream side of the throttle body, wherein the throttle body and the surge tank are side by side above the cylinder assembly, wherein the cleaner box is above the throttle body and the surge tank, and wherein the cleaner box, the throttle body and the surge tank are connected by pipes in an S-shaped configuration in a plan view.

9. A motorcycle comprising:

a body having a head pipe for steerably supporting a front wheel;

an engine unit mounted to the body, the engine unit including:

a crankcase having a crankshaft extending in a transverse direction of the body;

a drive shaft operatively connected to the crankshaft, the drive shaft being separated from and in parallel to the crankshaft;

an automatic transmission device provided on the drive shaft;

a driven shaft operatively connected to the drive shaft by the automatic transmission device; and a power transmission direction change device for changing a rotational direction of the driven shaft to transmit a driving power of the engine unit to a propeller shaft for power transmission to a rear wheel;

a pair of lower tubes extend from a lower portion of the head pipe rearward and downward to a position below the crankshaft, the pair of lower tubes extend from the position below the crankshaft rearward and upward through a space between the crankshaft and the power transmission direction change device when the space is viewed in a side view of the body;

a pair of main tubes extend from a front portion of the pair of lower tubes rearward above the engine unit and connect to a rear portion of the pair of lower tubes at a rear side of the engine unit, wherein the pair of lower tubes and the pair of main tubes form a loop-shaped frame when viewed in the side view of the body;

a sub-frame detachably provided on a lower side of a connection portion of the pair of main tubes and the pair of lower tubes;

a suspension device supported by the sub-frame, said suspension device supporting the rear wheel; and a link mechanism for shock absorbers connected to the suspension device.

10. A motorcycle comprising:

a body;

an engine unit mounted to the body, the engine unit including:

a crankcase having a cylinder assembly disposed in a front portion of the crankcase and a crankshaft extending in a transverse direction of the body;

a drive shaft operatively connected to the crankshaft by a primary drive gear provided at one end of the crankshaft at a first lateral side of the body, the drive shaft being separated from and in parallel to the crankshaft;

an automatic transmission device provided on the drive shaft on a second lateral side of the body opposite the primary drive gear; and a driven shaft operatively connected to the drive shaft by the automatic transmission device; and an exhaust pipe having a base portion connected to a lower portion of the cylinder assembly, wherein the crankcase extends downward on the first lateral side below the primary drive gear to form an oil pan in the crankcase, and wherein the exhaust pipe extends rearward through a space on the second lateral side directly below the automatic transmission device in a vicinity of a side member of the oil pan.

* * * * *